(12) United States Patent
Nakai

(10) Patent No.: US 11,584,281 B2
(45) Date of Patent: Feb. 21, 2023

(54) BUS HANDRAIL AND BUS VEHICLE INTERIOR STRUCTURE

(71) Applicant: Toyota Jidosha Kabushiki Kaisha, Toyota (JP)

(72) Inventor: Fumiko Nakai, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 162 days.

(21) Appl. No.: 16/871,555

(22) Filed: May 11, 2020

(65) Prior Publication Data
US 2021/0009021 A1 Jan. 14, 2021

(30) Foreign Application Priority Data
Jul. 9, 2019 (JP) .............................. JP2019-127742

(51) Int. Cl.
*B60N 3/02* (2006.01)
*B60N 2/24* (2006.01)
*B62D 31/02* (2006.01)

(52) U.S. Cl.
CPC .............. *B60N 3/02* (2013.01); *B60N 2/242* (2013.01); *B62D 31/02* (2013.01); *B60N 2002/247* (2013.01)

(58) Field of Classification Search
CPC ........... B60N 3/02; B60N 2/242; B62D 31/02
USPC .......................... 296/64; 414/556; 280/801.3
See application file for complete search history.

(56) References Cited

U.S. PATENT DOCUMENTS

| | | | | |
|---|---|---|---|---|
| 5,149,246 | A * | 9/1992 | Dorn | A61G 3/062 414/921 |
| 7,523,993 | B1 * | 4/2009 | Daneault | B60N 2/242 244/118.6 |
| 2002/0084403 | A1 | 7/2002 | Okita | |
| 2012/0161469 | A1 * | 6/2012 | Kerr | B62D 47/02 296/178 |
| 2012/0219395 | A1 * | 8/2012 | Inaguma | A61G 3/062 414/556 |

FOREIGN PATENT DOCUMENTS

| | | |
|---|---|---|
| CN | 202806483 U | 3/2013 |
| CN | 108482220 B | 9/2020 |
| JP | 2007-230281 A | 9/2007 |
| JP | 2011-056977 A | 3/2011 |
| JP | 2015-071353 A | 4/2015 |

\* cited by examiner

*Primary Examiner* — D Glenn Dayoan
*Assistant Examiner* — Sunsurraye Westbrook
(74) *Attorney, Agent, or Firm* — Dinsmore & Shohl LLP

(57) ABSTRACT

A bus handrail provided in a vehicle interior of a bus in a shape of "L" as viewed in a vehicle width direction has, in an installed state thereof, a first grip portion extending in a vehicle vertical direction, a second grip portion extending backward with respect to a vehicle continuously from a lower part of the first grip portion, a third grip portion extending upward with respect to the vehicle continuously from the second grip portion, and a fourth grip portion extending backward with respect to the vehicle continuously from the third grip portion. Besides, in a bus vehicle interior structure equipped with the bus handrail and a seat provided on a rear wall side in the vehicle interior and in which a passenger sits in a half-standing posture, part of the fourth grip portion is arranged outside the seat in the vehicle width direction.

11 Claims, 14 Drawing Sheets

BUS HANDRAIL AND BUS VEHICLE INTERIOR STRUCTURE

CROSS-REFERENCE TO RELATED APPLICATIONS

This application claims priority to Japanese Patent Application No. 2019-127742 filed on Jul. 9, 2019, which is incorporated herein by reference in its entirety including the specification, drawings and abstract.

BACKGROUND

1. Technical Field

The disclosure relates to a bus handrail and a bus vehicle interior structure.

2. Description of Related Art

There is conventionally known a structure in which an upper support pipe and a lower support pipe are arranged along a horizontal direction in a multipurpose space provided at a corner close to a platform in a vehicle interior of a railroad vehicle (see Japanese Patent Application Publication No. 2007-230281 (JP 2007-230281 A)). In this structure, the lower support pipe is arranged closer to the vehicle interior side than the upper support pipe.

SUMMARY

In the aforementioned structure, an adult passenger in a standing posture or a half-standing posture can grip the upper support pipe, and a child passenger in a standing posture and a passenger in a wheelchair can grip the lower support pipe. That is, the aforementioned structure adopts a configuration in which the two support pipes (handrails) are provided in advance vertically apart from each other, so as to be able to cope with differences among the positions corresponding to the heights of the hands of the passengers.

In a vehicle interior of a bus, however, there are restrictions on the space in which handrails are provided, due to the arrangement of seats, the arrangement of windows, and the like. Therefore, the handrails may not be appropriately arranged at a position corresponding to the height of, for example, the hands of a passenger in a wheelchair.

It is thus an object of the disclosure to obtain a bus handrail that can appropriately cope with the positions corresponding to the heights of the hands of passengers who are on board a bus in a variety of postures, and a bus vehicle interior structure that is equipped with the bus handrail.

In order to achieve the above-mentioned object, a bus handrail according to a first aspect of the disclosure is provided in a vehicle interior of a bus in a shape of "L" as viewed in a vehicle width direction, and has, in an installed state thereof, a first grip portion that extends in a vehicle vertical direction, a second grip portion that extends toward one side in a vehicle longitudinal direction continuously from a lower part of the first grip portion, a third grip portion that extends upward with respect to a vehicle continuously from the second grip portion, and a fourth grip portion that extends toward one side in the vehicle longitudinal direction continuously from the third grip portion.

According to the above configuration, the bus handrail that is provided in the vehicle interior of the bus in the shape of "L" as viewed in the vehicle width direction has, in the installed state thereof, the first grip portion that extends in the vehicle vertical direction, the second grip portion that extends toward one side in the vehicle longitudinal direction continuously from the lower part of the first grip portion, the third grip portion that extends upward with respect to the vehicle continuously from the second grip portion, and the fourth grip portion that extends toward one side in the vehicle longitudinal direction continuously from the third grip portion. That is, the second grip portion is arranged below the fourth grip portion with respect to the vehicle.

Accordingly, for example, adult and child passengers in a standing posture can grip the first grip portion, and adult and child passengers in a half-standing posture can grip the fourth grip portion. Moreover, a passenger in a wheelchair can grip the lower part of the first grip portion, the second grip portion, or the third grip portion. In this manner, the single bus handrail can appropriately cope with the positions corresponding to the heights of the hands of the passengers who are on board the bus in a variety of postures.

Incidentally, the shape of "L" in the disclosure may not necessarily be an exact shape of "L", but also includes a rough shape of "L" that has a curved portion, a bent portion or the like halfway or that is discontinuous. Furthermore, the upward direction with respect to the vehicle in the disclosure may not necessarily be an exactly upward direction, but also includes a substantially upward direction such as a diagonally upward direction or the like. Besides, "the bus" in the disclosure generally means a shared automobile that can run with a plurality of passengers on board, regardless of whether or not the passengers are required to pay fares. The "bus" in the disclosure also includes a so-called mobility-as-a-service (Maas) vehicle, for example, an automatically driven bus or the like.

Besides, in the first aspect, a bus handrail may have a fifth grip portion that directly couples the first grip portion and the fourth grip portion to each other.

According to the above configuration, the bus handrail has the fifth grip portion that directly couples the first grip portion and the fourth grip portion to each other. Accordingly, for example, adult and child passengers in a standing posture can grip the fifth grip portion as well. Besides, a closed space (a loop-shaped space) can be formed by the lower part of the first grip portion, the second grip portion, the third grip portion, and the fifth grip portion, so the durability of the bus handrail is improved.

Besides, a bus handrail according to a second aspect of the disclosure is provided in a vehicle interior of a bus, and has, in an installed state thereof, a first grip portion that extends in a vehicle vertical direction, a second grip portion that extends toward one side in a vehicle longitudinal direction continuously from a lower part of the first grip portion, a third grip portion that extends upward with respect to a vehicle continuously from the second grip portion, a fourth grip portion that extends toward one side in the vehicle longitudinal direction continuously from the third grip portion, a fifth grip portion that directly couples the first grip portion and the fourth grip portion to each other, and a sixth grip portion that directly couples an upper part of the first grip portion and a midway part of the fifth grip portion to each other.

According to the above configuration, the bus handrail that is provided in the vehicle interior of the bus has, in the installed state thereof, the first grip portion that extends in the vehicle vertical direction, the second grip portion that extends toward one side in the vehicle longitudinal direction continuously from the lower part of the first grip portion, the third grip portion that extends upward with respect to the vehicle continuously from the second grip portion, the fourth grip portion that extends toward one side in the vehicle longitudinal direction continuously from the third grip portion, the fifth grip portion that directly couples the first grip portion and the fourth grip portion to each other, and the sixth grip portion that directly couples the upper part of the first grip portion and the midway part of the fifth grip portion to each other. That is, the second grip portion is arranged below the fourth grip portion and the fifth grip portion with respect to the vehicle.

Accordingly, for example, adult and child passengers in a standing posture can grip the first grip portion, the fifth grip portion, or the sixth grip portion, and adult and child passengers in a half-standing posture can grip the fourth grip portion. Moreover, a passenger in a wheelchair can grip the lower part of the first grip portion, the second grip portion, or the third grip portion. In this manner, the single bus handrail can appropriately cope with the positions corresponding to the heights of the hands of the passengers who are on board the bus in a variety of postures. Besides, a closed space (a loop-shaped space) can be formed by the lower part of the first grip portion, the second grip portion, the third grip portion, and the fifth grip portion, and another closed space (another loop-shaped space) can be formed by the first grip portion and the sixth grip portion, so the durability of the bus handrail is improved.

Besides, in the first aspect, a height of the second grip portion from a floor surface in the vehicle interior may range from 700 to 800 mm.

According to the above configuration, the height of the second grip portion from the floor surface in the vehicle interior ranges from 700 to 800 mm. It should be noted herein that the position corresponding to the height of 700 to 800 mm is substantially the same as the position corresponding to the height of the breast of an adult passenger sitting in a wheelchair. Accordingly, the adult passenger sitting in the wheelchair finds it easier to grip the lower part of the first grip portion, the second grip portion, or the third grip portion than in the case where the position corresponds to a height that is lower than 700 mm or higher than 800 mm.

Besides, in the first aspect, an angle that is formed by the third grip portion and the fourth grip portion may be an obtuse angle.

According to the above configuration, the angle that is formed by the third grip portion and the fourth grip portion is an obtuse angle. Accordingly, when extending his or her hand from the first grip portion side to the third grip portion side, an adult passenger sitting in a wheelchair does not have to bend his or her wrist upward with respect to the vehicle by constraint, and hence finds it easy to grip the third grip portion.

Besides, in the first aspect, the obtuse angle may range from 100 to 150°.

According to the above configuration, the obtuse angle ranges from 100 to 150°. Accordingly, an adult passenger sitting in a wheelchair does not have to bend his or her wrist downward with respect to the vehicle as well as upward with respect to the vehicle by constraint, and hence finds it easier to grip the third grip portion than in the case where the obtuse angle is smaller than 100° or larger than 150°.

A bus vehicle interior structure according to a third aspect of the disclosure is equipped with the bus handrail according to the first or second aspect, and a seat that is provided on at least one of a front wall side and a rear wall side in the vehicle and in which a passenger sits in a half-standing posture. Part of the fourth grip portion is arranged outside the seat in the vehicle width direction.

According to the above configuration, the single bus handrail can appropriately cope with the positions corresponding to the heights of the hands of passengers who are on board the bus in a variety of postures. Besides, part of the fourth grip portion is arranged outside the seat in which the passenger sits in a half-standing posture, in the vehicle width direction. Therefore, adult and child passengers in a half-standing posture find it easy to grip the fourth grip portion.

Besides, in the third aspect, the third grip portion may be arranged between the first grip portion and the seat as viewed in the vehicle width direction.

According to the above configuration, the third grip portion is arranged between the first grip portion and the seat as viewed in the vehicle width direction. Accordingly, even a passenger in a wheelchair who is on board the bus in such a posture as to face the seat (a backward-looking posture) finds it easier to grip the third grip portion than in the case where the third grip portion is arranged at a position overlapping with the seat, for example, in a lateral view.

Besides, in the third aspect, a positioning portion against which part of a wheelchair may be placed to be positioned is provided on a lower side of the seat with respect to the vehicle.

According to the above configuration, the positioning portion against which part of the wheelchair is placed to be positioned is provided on the lower side of the seat with respect to the vehicle. Accordingly, for example, even when inertia acts, the part of the wheelchair is pressed against the positioning portion, and the wheelchair is made difficult to move, by gripping the bus handrail forcefully.

As described above, with the disclosure, the bus handrail that is provided in the vehicle interior of the bus can appropriately cope with the positions corresponding to the heights of the hands of passengers who are on board the bus in a variety of postures.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The embodiments will be described hereinafter in detail based on the drawings. Incidentally, for the sake of convenience of explanation, arrows UP, FR, and RH that are depicted in the respective drawings as appropriate denote an upward direction with respect to a vehicle, a forward direction with respect to the vehicle, and a rightward direction with respect to the vehicle, respectively. Accordingly, when a vertical direction, a longitudinal direction, and a lateral direction are mentioned in the following description without being specified otherwise, the up and down in a vehicle vertical direction, the front and back in a vehicle longitudinal direction, and the right and left in a vehicle lateral direction (a vehicle width direction) are meant respectively. Besides, "a lateral view" means a view in the vehicle width direction.

First Embodiment

Figure 1:
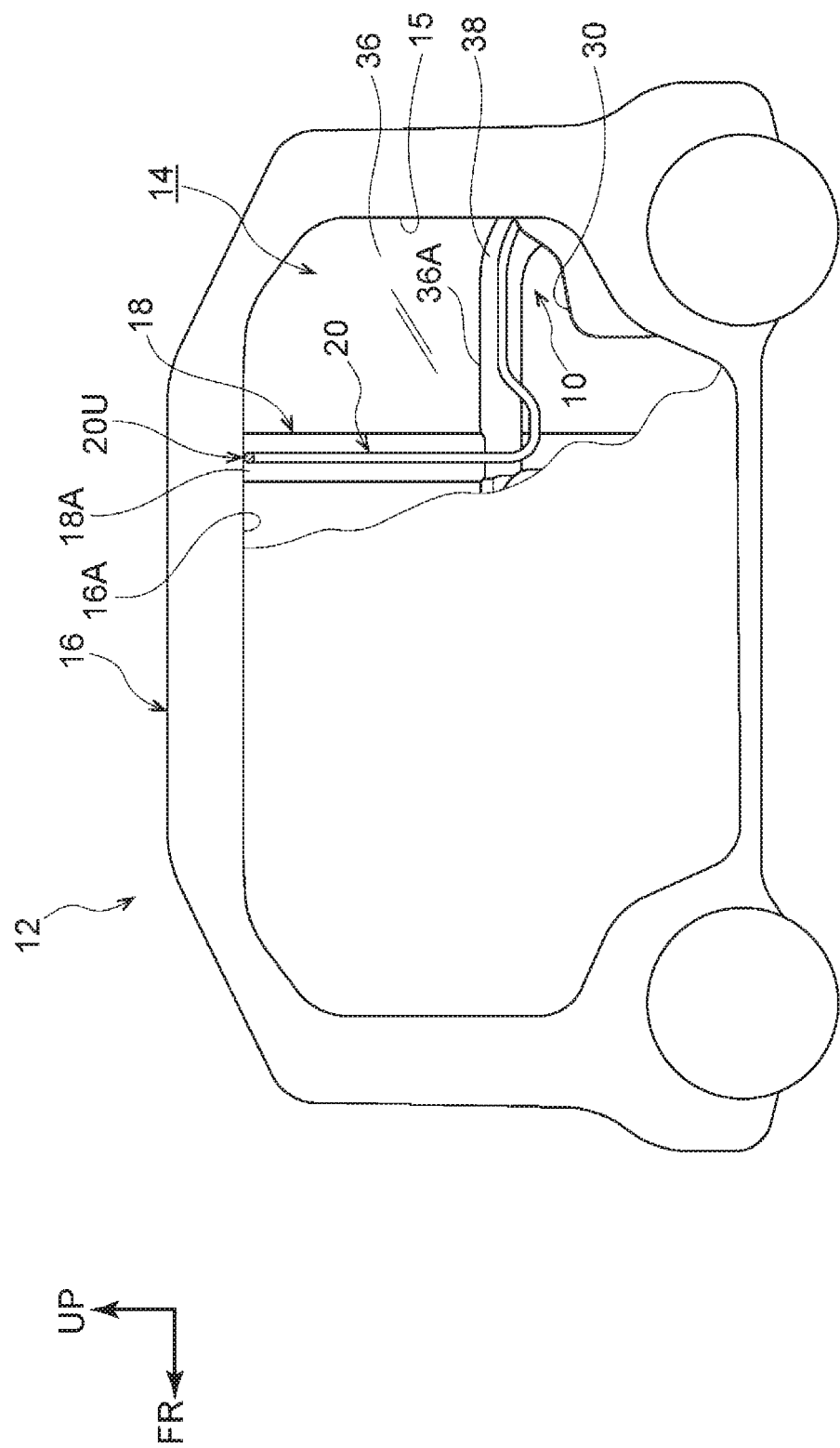
FIG. 1 is a lateral view of a bus in which a handrail according to the first embodiment is installed.

First of all, the first embodiment will be described. As shown in FIG. 1, bus handrails (which may be hereinafter referred to simply as "the handrails") 20 according to the first embodiment are provided in a vehicle interior 14 of a bus 12 (including an automatically driven bus or the like). Each of the handrails 20 is cylindrically formed of a metal such as aluminum or the like, and has an outer diameter ranging, for example, from 30 mm to 40 mm. Moreover, a pair of the right and left handrails 20 is arranged along a pillar inner panel 18A as a wall surface (a lateral wall) of a pillar 18 on the vehicle interior 14 side, and a lower trim 38 that will be described later.

In concrete terms, upper end portions of the handrails 20 are integrally coupled to each other by a coupling portion 20U that extends in the vehicle width direction. The coupling portion 20U is arranged close to a roof inner panel 16A as a wall surface (a ceiling wall) of a roof 16 on the vehicle interior 14 side. Moreover, a plurality of (e.g., two) brackets (not shown) is provided in such a manner as to protrude upward with a predetermined length, apart from each other in the vehicle width direction by a predetermined clearance. A tip of each of the brackets is attached to the roof inner panel 16A by being fastened thereto by a bolt.

That is, these handrails 20 are provided in such a state as to be suspended from the roof inner panel 16A. Incidentally, for example, a tall passenger in a standing posture can also utilize the coupling portion 20U as a handrail. Besides, the first embodiment will be described with the rear handrail 20 on a right lateral wall side cited as an example.

Figure 2:
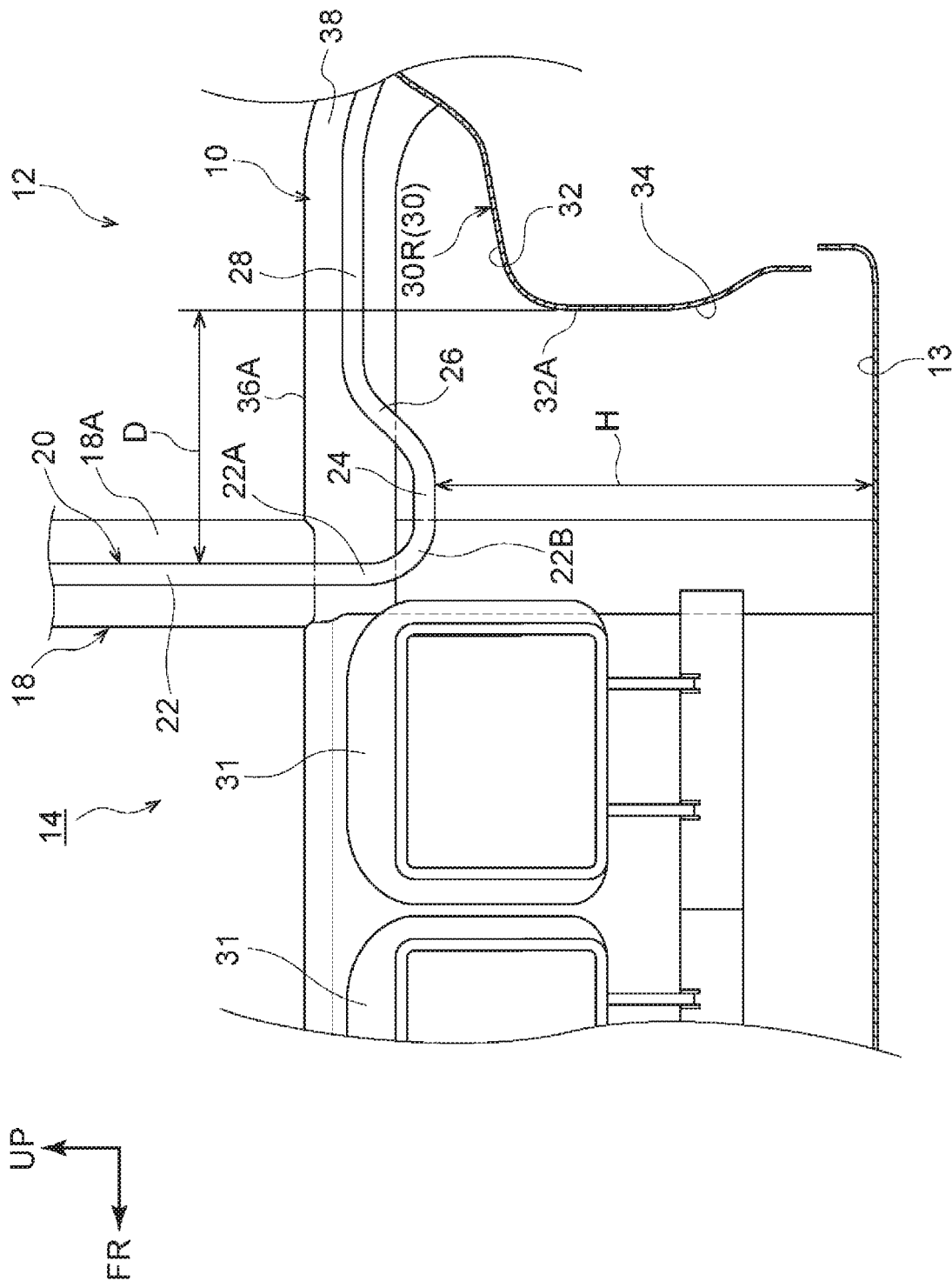
FIG. 2 is a lateral view showing the handrail according to the first embodiment.
Figure 3:
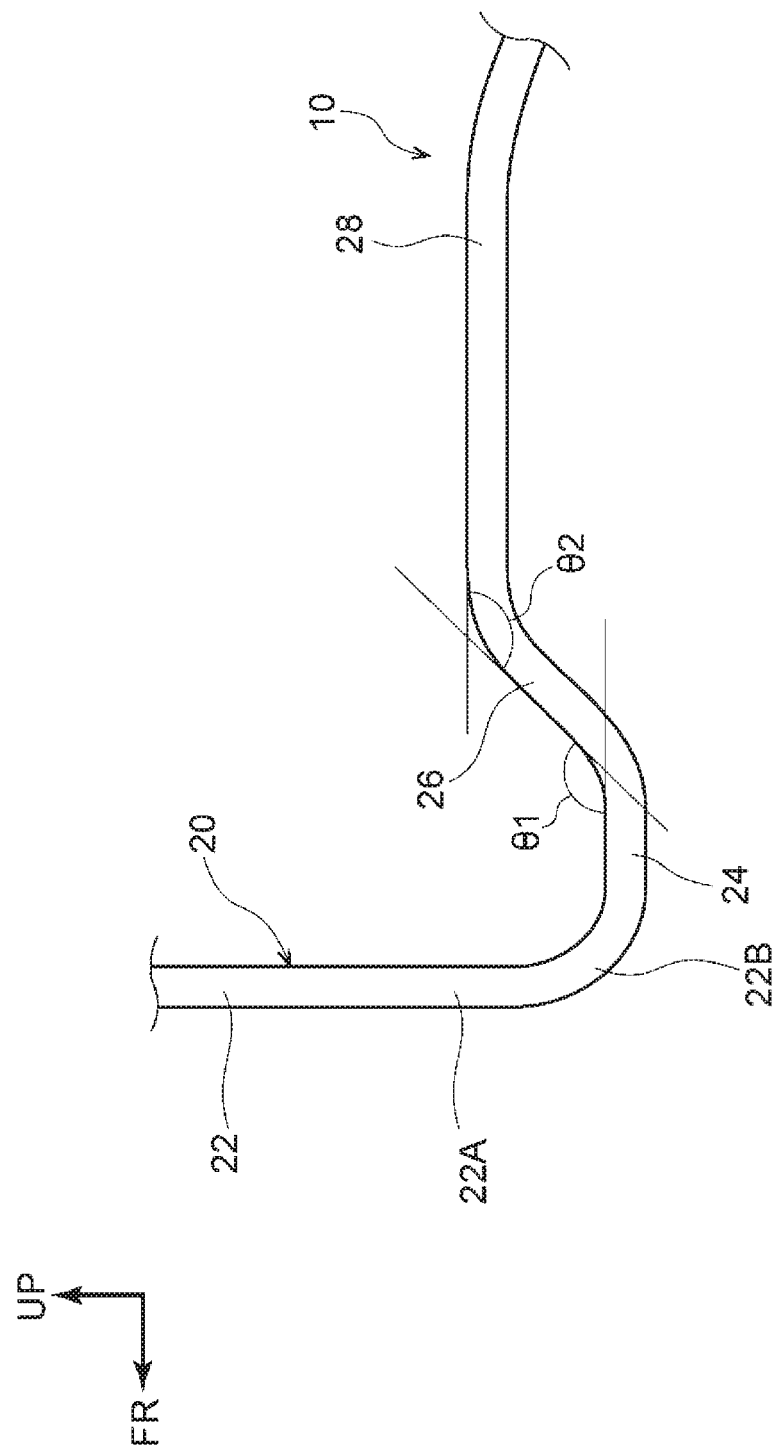
FIG. 3 is a lateral view showing a part of the handrail according to the first embodiment on an enlarged scale.

As shown in FIGS. 2 and 3, the handrail 20 that is arranged along the pillar inner panel 18A and the lower trim 38 is formed substantially in the shape of "L" in a lateral view. More specifically, the handrail 20 has, in an installed state thereof, a first grip portion 22 that faces the pillar inner panel 18A and that extends in the vertical direction.

A plurality of (e.g., two) brackets (not shown) is provided in such a manner as to protrude outward in the vehicle width direction with a predetermined length, apart from each other by a predetermined clearance in the vertical direction, on a peripheral surface of the first grip portion 22 other than a lower part 22A that is located below a lower side edge part 36A of a rear side glass 36 (see FIG. 1) as a window in a lateral view.

Moreover, a tip of each of the brackets is attached to the pillar inner panel 18A by being fastened thereto by a bolt. Thus, the first grip portion 22 is arranged apart from the pillar inner panel 18A inward in the vehicle width direction, and a gap into which a finger can be inserted is formed between the first grip portion 22 and the pillar inner panel 18A.

Besides, the handrail 20 has a second grip portion 24 that is bent substantially at a right angle continuously from a lower end part 22B (a lowermost region of the lower part 22A) of the first grip portion 22 and that integrally extends backward (toward one side in the longitudinal direction). Moreover, the handrail 20 has a third grip portion 26 that is bent at a predetermined angle θ1 (see FIG. 3) continuously from a rear end portion of the second grip portion 24 and that integrally extends diagonally upward and backward (toward one side in the longitudinal direction and diagonally backward).

Furthermore, the handrail 20 has a fourth grip portion 28 that is bent at a predetermined angle θ2 (see FIG. 3) continuously from an upper end part of the third grip portion 26 and that integrally extends backward (toward one side in the longitudinal direction). Incidentally, a rear end part 28A (see FIG. 8) of the fourth grip portion 28 is bent outward in the vehicle width direction, and a tip of the rear end part 28A is attached to a lower trim 38 as a wall surface (a lateral wall) located below the lower side edge part 36A of the rear side glass 36, by being fastened thereto by a bolt.

Thus, the second grip portion 24, the third grip portion 26, and the fourth grip portion 28 other than the rear end part 28A are arranged apart from the lower trim 38 inward in the vehicle width direction, and a gap into which a finger can be inserted is formed between each of the second grip portion 24, the third grip portion 26, and the fourth grip portion 28 other than the rear end part 28A and the lower trim 38. Moreover, no bracket is provided in a protruding manner at the lower part 22A of the first grip portion 22 (including the lower end part 22B), the second grip portion 24, the third grip portion 26, and the fourth grip portion 28 other than the rear end part 28A.

Besides, as shown in FIG. 2, a height H of the second grip portion 24 from a floor surface 13 in the vehicle interior 14 ranges from 700 to 800 mm in a lateral view. Moreover, as shown in FIG. 3, the predetermined angle θ1 that is formed by the second grip portion 24 and the third grip portion 26 is an obtuse angle in a lateral view.

In concrete terms, the angle θ1 ranges from 100 to 150°. Incidentally, due to a relationship between alternate angles, the predetermined angle θ2 that is formed by the third grip portion 26 and the fourth grip portion 28 is also an obtuse angle equal to the predetermined angle θ1 in a lateral view. That is, the angle θ2 ranges from 100 to 150°.

Besides, as shown in FIGS. 1 and 2, a plurality of rear seats (hereinafter referred to simply as "seats") 30 in which adult passengers or child passengers sit in a half-standing posture (see FIG. 14A) is provided side by side in the vehicle width direction, on the rear wall 15 side of the vehicle interior 14 (see FIG. 8). Moreover, part of the fourth grip portion 28 including the rear end part 28A is arranged outside the seat 30 (a right-end seat 30R) in the vehicle width direction in a plan view (see FIG. 8). Incidentally, the handrails 20 and the seats 30 constitute a bus vehicle interior structure 10 according to the present embodiment.

Besides, as shown in FIG. 2, the third grip portion 26 is arranged between a front end part 32A of a seating surface 32 of the seat 30 and the first grip portion 22 (in a gap in the longitudinal direction indicated by an arrow D) in a lateral view. A flat plate-like positioning portion 34 against which part of a wheelchair 40 is placed to be positioned is provided on a lower side of the seat 30, integrally with the front end part 32A of the seat 30. Still further, a platform 17 (see FIG. 13) is provided through part of a left lateral wall (e.g., a central part in the longitudinal direction) of this bus 12, and a plurality of foldable seats 31 is provided side by side in the longitudinal direction at a central part on a right lateral wall side of the vehicle interior 14 in the longitudinal direction.

Next, the operation of the bus handrails 20 and the bus vehicle interior structure 10 according to the first embodiment configured as described above will be described.

Figure 4:
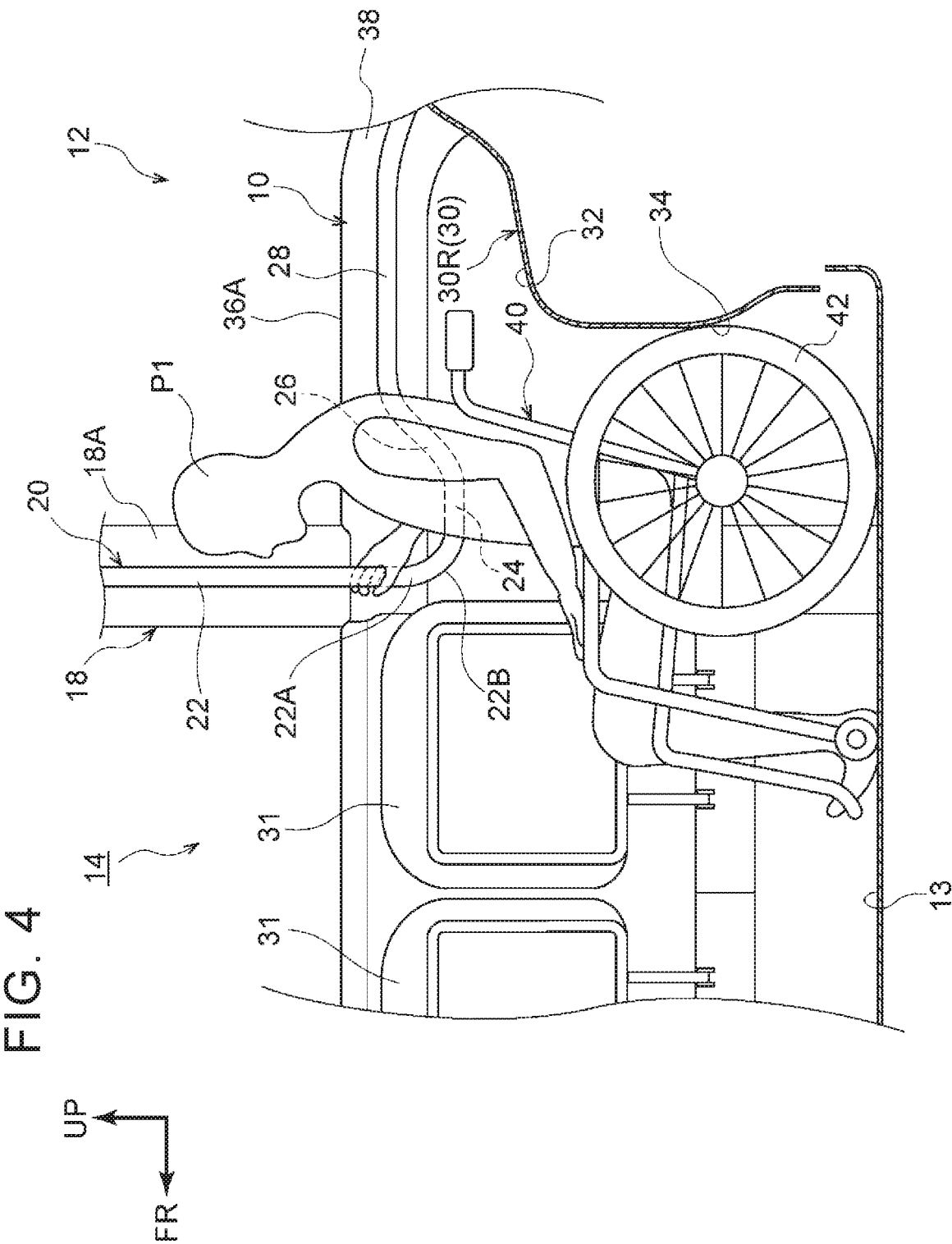
FIG. 4 is a lateral view showing an adult passenger in a wheelchair who grips the handrail according to the first embodiment in a forward-looking posture.

As shown in FIG. 4, an adult passenger P1 sitting in the wheelchair 40 may be on board in front of the right-end seat 30R in a forward-looking posture when getting on the bus 12. At this time, part of the wheelchair 40 (e.g., a pair of right and left main wheels 42) abuts on the positioning portion 34 provided on the lower side of the seat 30R, in such a manner as to face backward.

Thus, a movable range of the right hand of the passenger P1 in the wheelchair 40, namely, a right hand reach area as a substantially conical virtual area that is formed when the passenger moves his or her right arm around his or her right shoulder within a reasonable range is determined. Then, for example, even when inertia acts in the vehicle interior 14 of the bus 12, the part (the main wheels 42) of the wheelchair 40 can be pressed against the positioning portion 34, and the wheelchair 40 can be made difficult to move, by gripping the handrail 20 forcefully.

Figure 14A:
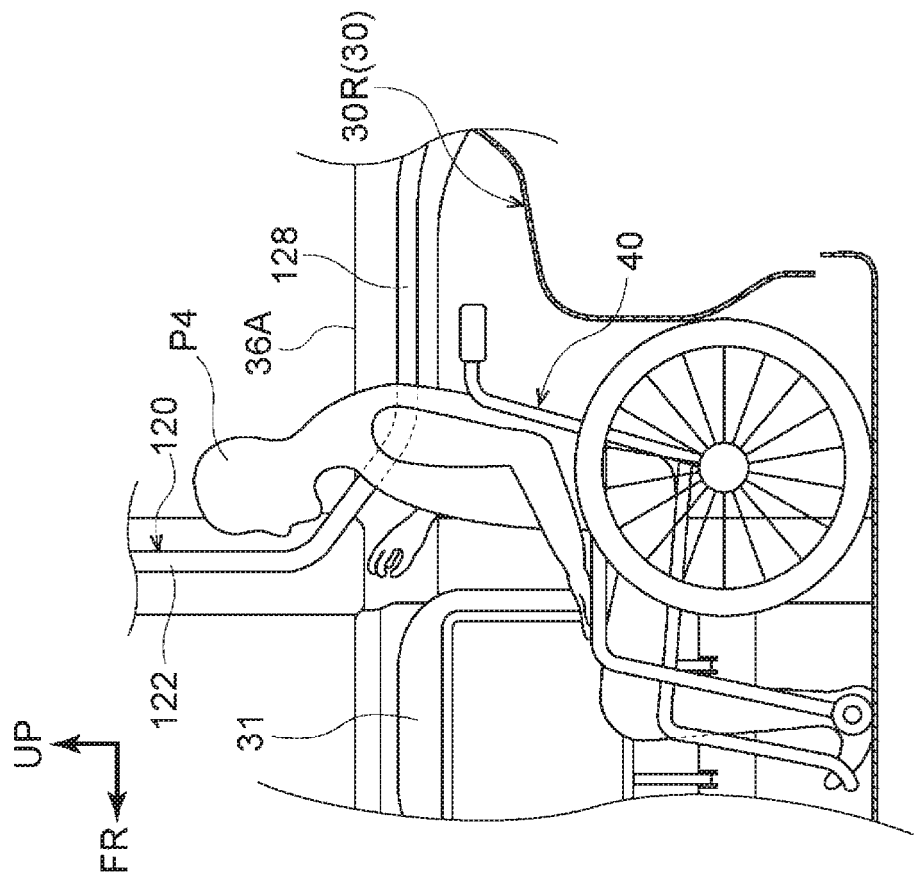
FIG. 14A is a lateral view showing a handrail according to a comparative example together with a passenger in a half-standing posture.

It should be noted herein that a grip portion 128 that extends in the longitudinal direction is arranged at a position suitable for an adult passenger P3 sitting in the right-end seat 30R in a half-standing posture (where the passenger P3 can grip the grip portion 128 with his or her right hand), in a handrail 120 according to a comparative example, as shown in FIG. 14A. However, this handrail 120 has no regions corresponding to the second grip portion 24 and the third grip portion 26, and a grip portion 122 that extends in the vertical direction is not extended downward either (there is no region corresponding to the lower part 22A).

Figure 14B:
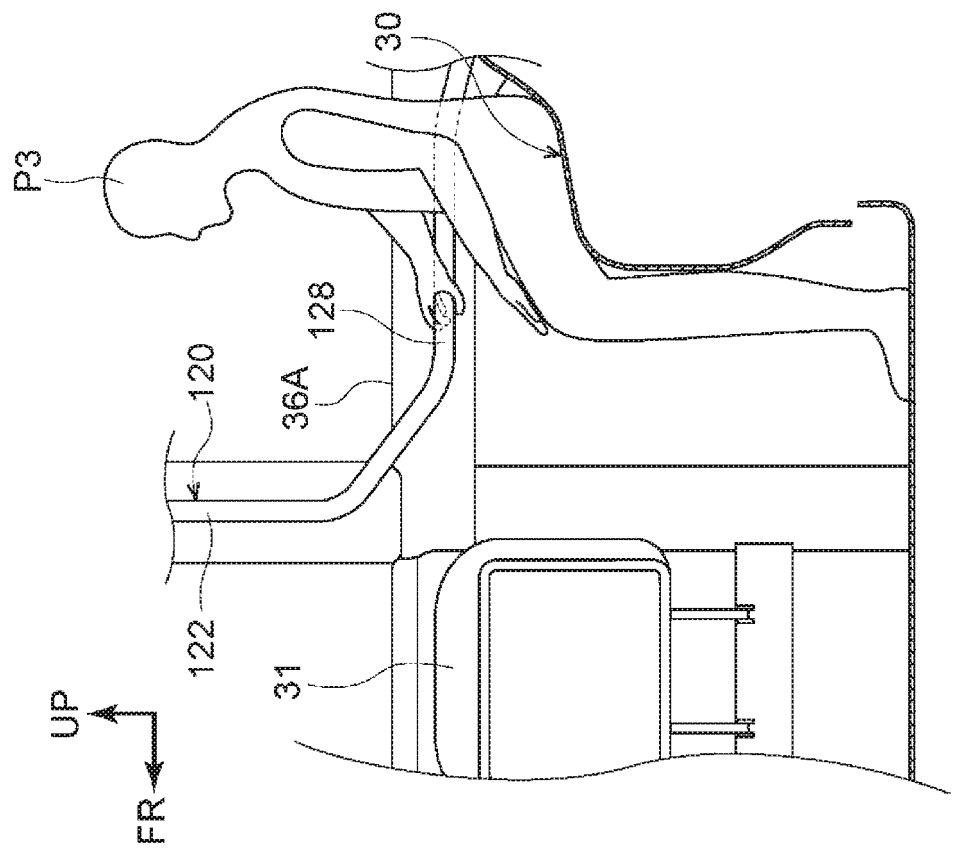
FIG. 14B is a lateral view showing the handrail according to the comparative example together with a passenger in a wheelchair.

That is, as shown in FIG. 14B, the handrail 120 does not exist at an appropriate position within a movable range of the right hand (a right hand reach area) of a passenger P4 in the wheelchair 40 located in front of the right-end seat 30R. Accordingly, the passenger P4 in the wheelchair 40 finds it difficult to grip the handrail 120.

In contrast, as shown in FIG. 3, the handrail 20 according to the present embodiment has the first grip portion 22 having the lower part 22A extended further downward than the grip portion 122 of the handrail 120 according to the comparative example, the second grip portion 24, the third grip portion 26, and the fourth grip portion 28, and is configured such that the second grip portion 24 is arranged below the fourth grip portion 28. In other words, at least the lower part 22A of the first grip portion 22 and the second grip portion 24 exist within the movable range of the right hand (the right hand reach area) of the passenger P1 in the wheelchair 40 in a forward-looking posture.

Therefore, as shown in FIG. 4, the passenger P1 in the wheelchair 40 in a forward-looking posture, who is in front of the right-end seat 30R, finds it easy to grip the handrail 20 with his or her right hand. That is, the passenger P1 in this wheelchair 40 can easily grip the handrail 20 within the range from the lower part 22A of the first grip portion 22 to the second grip portion 24, with his or her right hand.

In addition, the height H of the second grip portion 24 from the floor surface 13 in the vehicle interior 14 ranges from 700 to 800 mm, and is approximately equal to the height of the breast of the passenger P1 in the wheelchair 40. Accordingly, the passenger P1 in the wheelchair 40 can more easily grip the lower part 22A of the first grip portion 22 or the second grip portion 24 than in the case where the height H is lower than 700 mm or higher than 800 mm.

Figure 5:
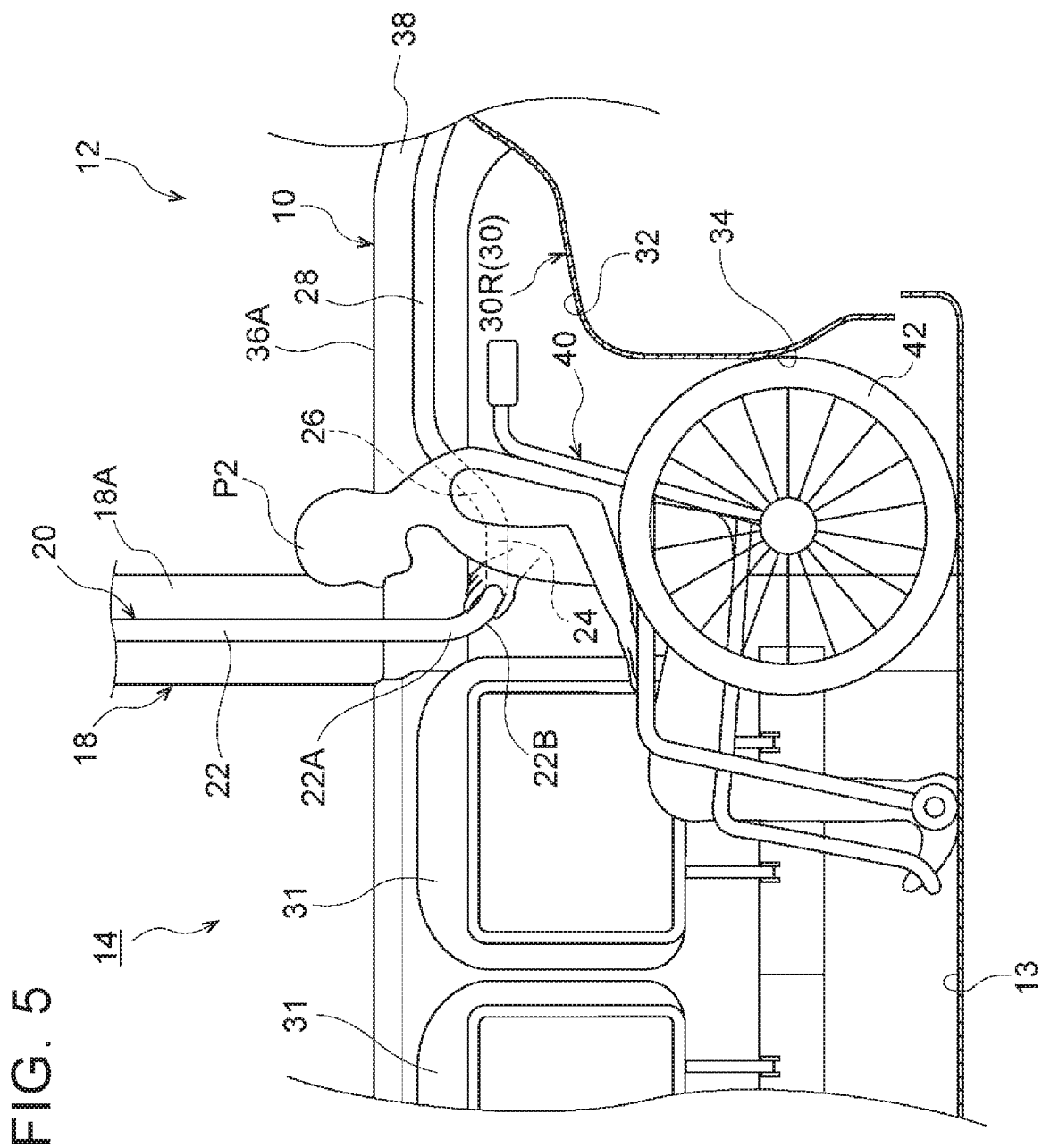
FIG. 5 is a lateral view showing a child passenger in a wheelchair who grips the handrail according to the first embodiment in a forward-looking posture.

Incidentally, as shown in FIG. 5, even when the passenger sitting in the wheelchair 40 in a forward-looking posture is a passenger shorter than the passenger P1 shown in FIG. 4 (e.g., a child passenger) P2, the handrail 20 according to the present embodiment can be easily gripped. That is, in this case as well, the passenger P2 in the wheelchair 40 in a forward-looking posture can easily grip the handrail 20 within the range from the lower part 22A of the first grip portion 22 to the second grip portion 24, with his or her right hand.

Figure 6:
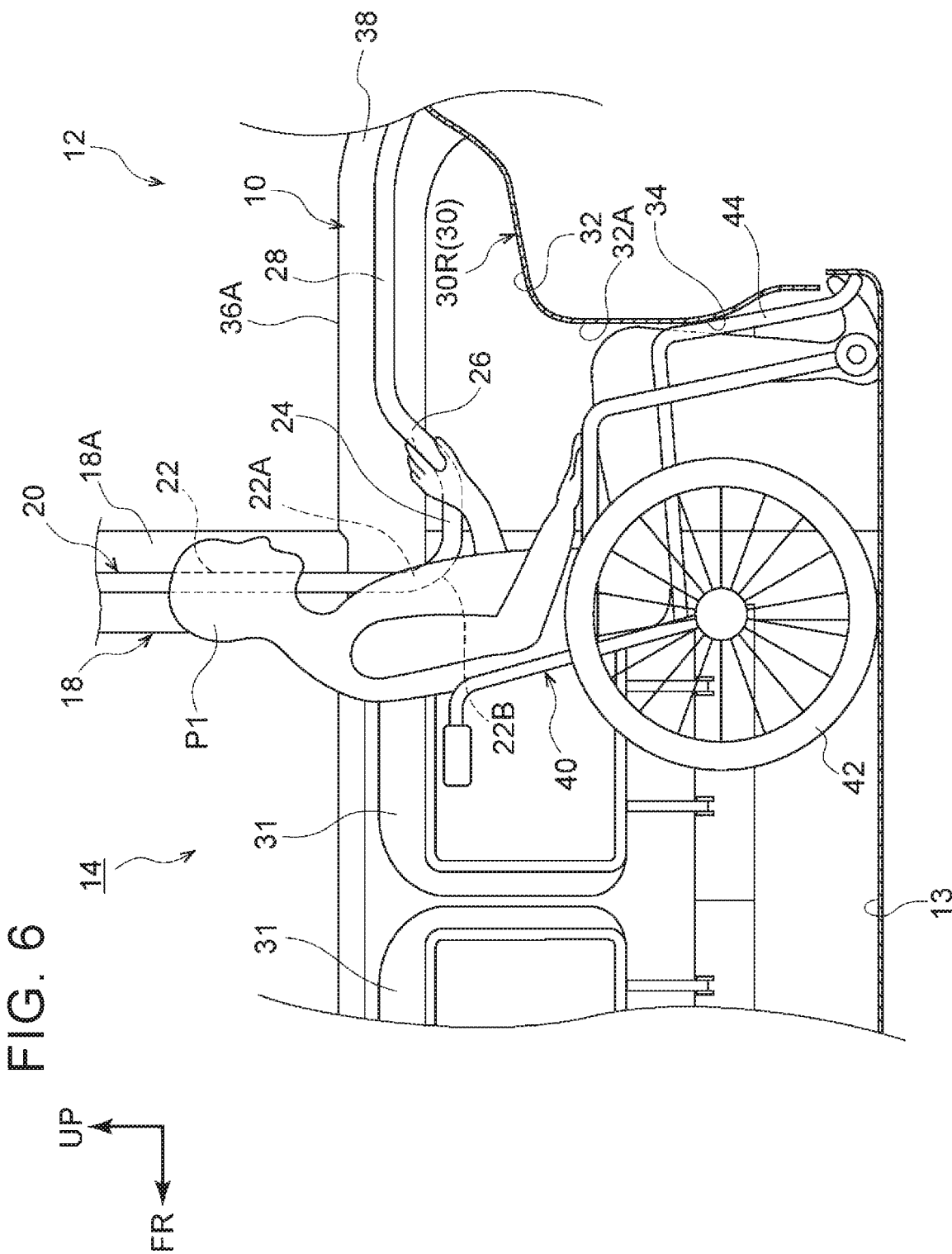
FIG. 6 is a lateral view showing the adult passenger in the wheelchair who grips the handrail according to the first embodiment in a backward-looking posture.

Besides, as shown in FIG. 6, the adult passenger P1 sitting in the wheelchair 40 may be on board in a backward-looking posture in front of the right-end seat 30R. At this time, part of the wheelchair 40 (e.g., a pair of right and left leg supports 44) abuts on the positioning portion 34 provided on the lower side of the seat 30R, in such a manner as to face backward.

Thus, a movable range of the left hand of the passenger P1 in the wheelchair 40, namely, a left hand reach area as a substantially conical virtual area that is formed when the passenger moves his or her left arm around his or her left shoulder within a reasonable range is determined. Then, for example, even when inertia acts in the vehicle interior 14 of the bus 12, the part (the leg supports 44) of the wheelchair 40 can be pressed against the positioning portion 34, and the wheelchair 40 can be made difficult to move, by gripping the handrail 20 forcefully.

Besides, the third grip portion 26 is arranged between the first grip portion 22 and the front end part 32A of the seating surface 32 of the seat 30R in a lateral view. Accordingly, at least the second grip portion 24 and the third grip portion 26 exist in a movable range of the left hand (the left hand reach area) of the passenger P1 in the wheelchair 40 who is on board in such a posture as to face the seat 30R, in comparison with a case where the third grip portion 26 is arranged at a position overlapping with the seat 30R, for example, in a lateral view.

Therefore, the passenger P1 sitting in the wheelchair 40 in a backward-looking posture in front of the right-end seat 30R finds it easy to grip the handrail 20 with his or her left hand. That is, the passenger P1 in this wheelchair 40 can easily grip the handrail 20 within the range from the second grip portion 24 to the third grip portion 26, with his or her left hand.

In addition, the angle θ1 that is formed by the third grip portion 26 and the fourth grip portion 28 is an obtuse angle.

Therefore, when extending his or her hand from the first grip portion 22 side (a front side) to the third grip portion 26 side (a rear side), the passenger P1 in the wheelchair 40 does not have to bend his or her wrist upward by constraint, and hence can easily grip the third grip portion 26 with his or her left hand.

Moreover, in particular, when the angle θ1 ranges from 100 to 150°, the passenger P1 in the wheelchair 40 can more easily grip the third grip portion 26 with his or her left hand than in the case where the angle θ1 is smaller than 100° or larger than 150°. This is because the passenger P1 in the wheelchair 40 does not have to bend his or her left wrist downward as well as upward by constraint.

Figure 7:
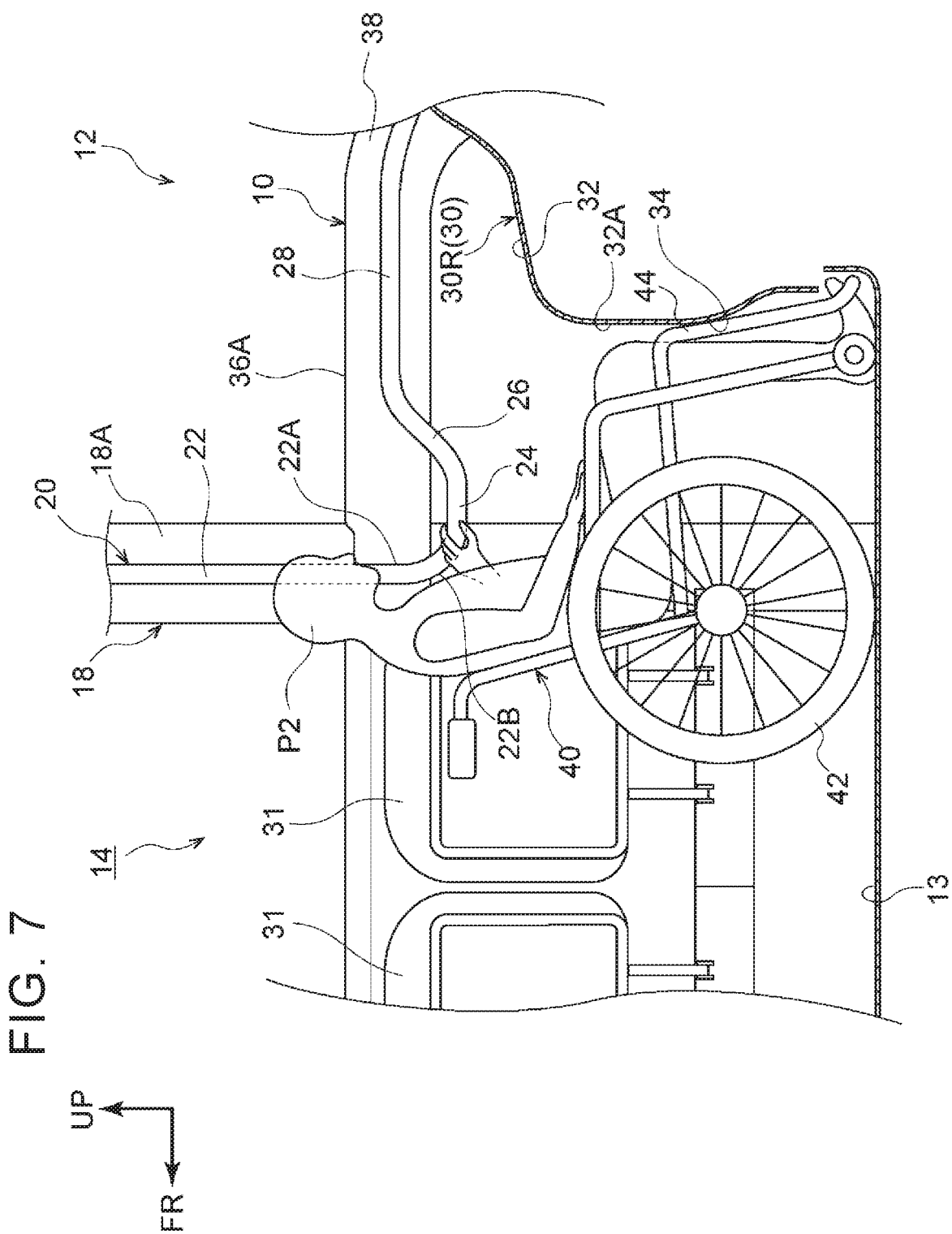
FIG. 7 is a lateral view showing the child passenger in the wheelchair who grips the handrail according to the first embodiment in a backward-looking posture.

Incidentally, as shown in FIG. 7, even in the case where the passenger sitting in the wheelchair 40 in a backward-looking posture is the passenger shorter than the passenger P1 shown in FIG. 6 (e.g., the child passenger) P2, the handrail 20 according to the present embodiment can be easily gripped. That is, in this case as well, the passenger P2 in the wheelchair 40 in a backward-looking posture can easily grip the handrail 20 within the range from the second grip portion 24 to the third grip portion 26, with his or her left hand.

Besides, part of the fourth grip portion 28 including the rear end part 28A is arranged outside the right-end seat 30R in the vehicle width direction in a plan view. Accordingly, an adult passenger and a child passenger who sit in the seat 30 with the seating surface higher than the wheelchair 40 in a half-standing posture can easily grip the fourth grip portion 28. Moreover, the adult passenger and the child passenger in a standing posture can easily grip the lower part 22A or the first grip portion 22 located above the lower part 22A.

Thus, according to the first embodiment, the single handrail 20 can appropriately cope with the positions corresponding to the heights of the hands of passengers who are on board the bus 12 in a variety of postures. In consequence, the safety of the passengers who are on board the bus 12 in a variety of postures (including the passenger P1 or P2 in the wheelchair 40 who is on board in a forward-looking posture or a backward-looking posture) can be further improved when the bus 12 runs.

Figure 8:
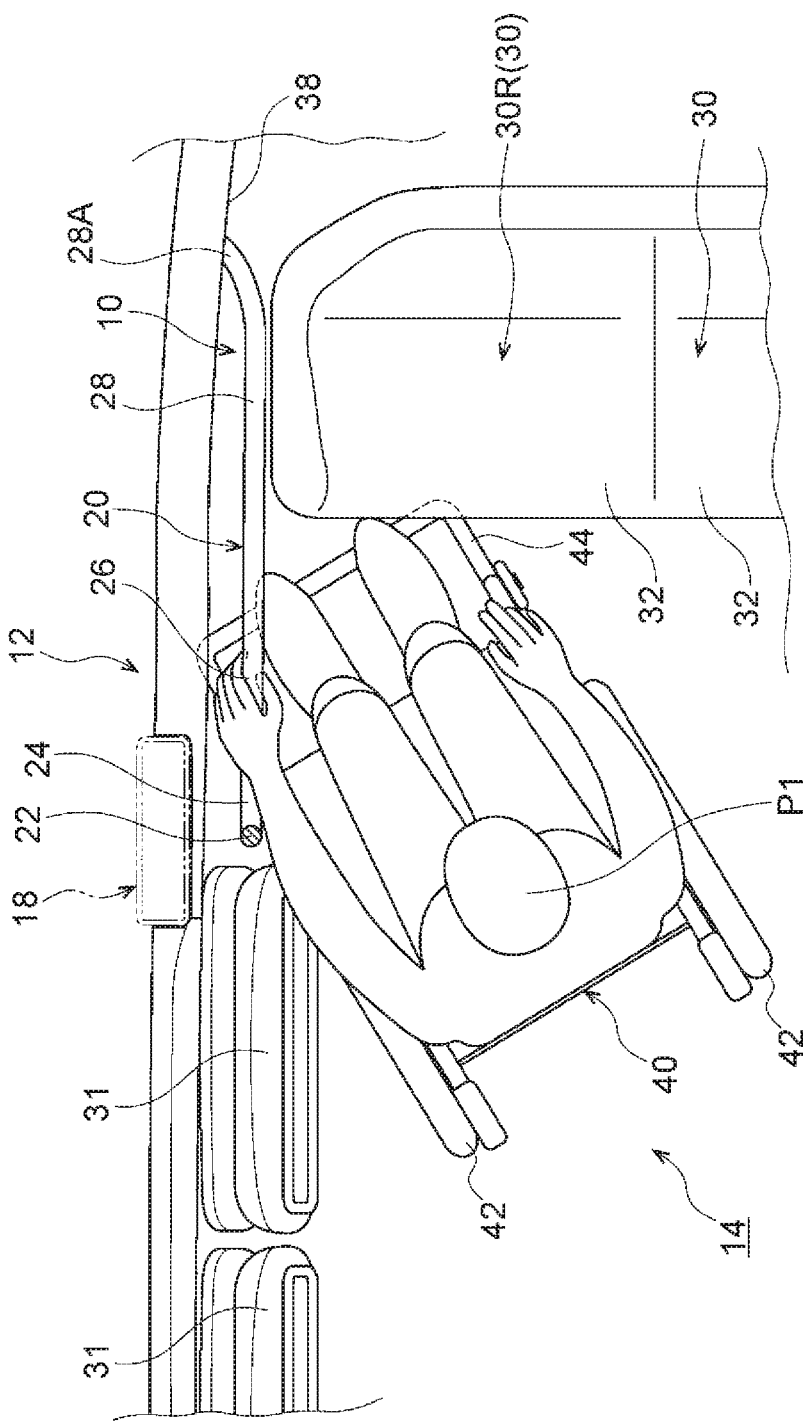
FIG. 8 is a plan view showing a passenger in a wheelchair who grips the handrail according to the first embodiment in a diagonally backward-looking posture.
Figure 9:
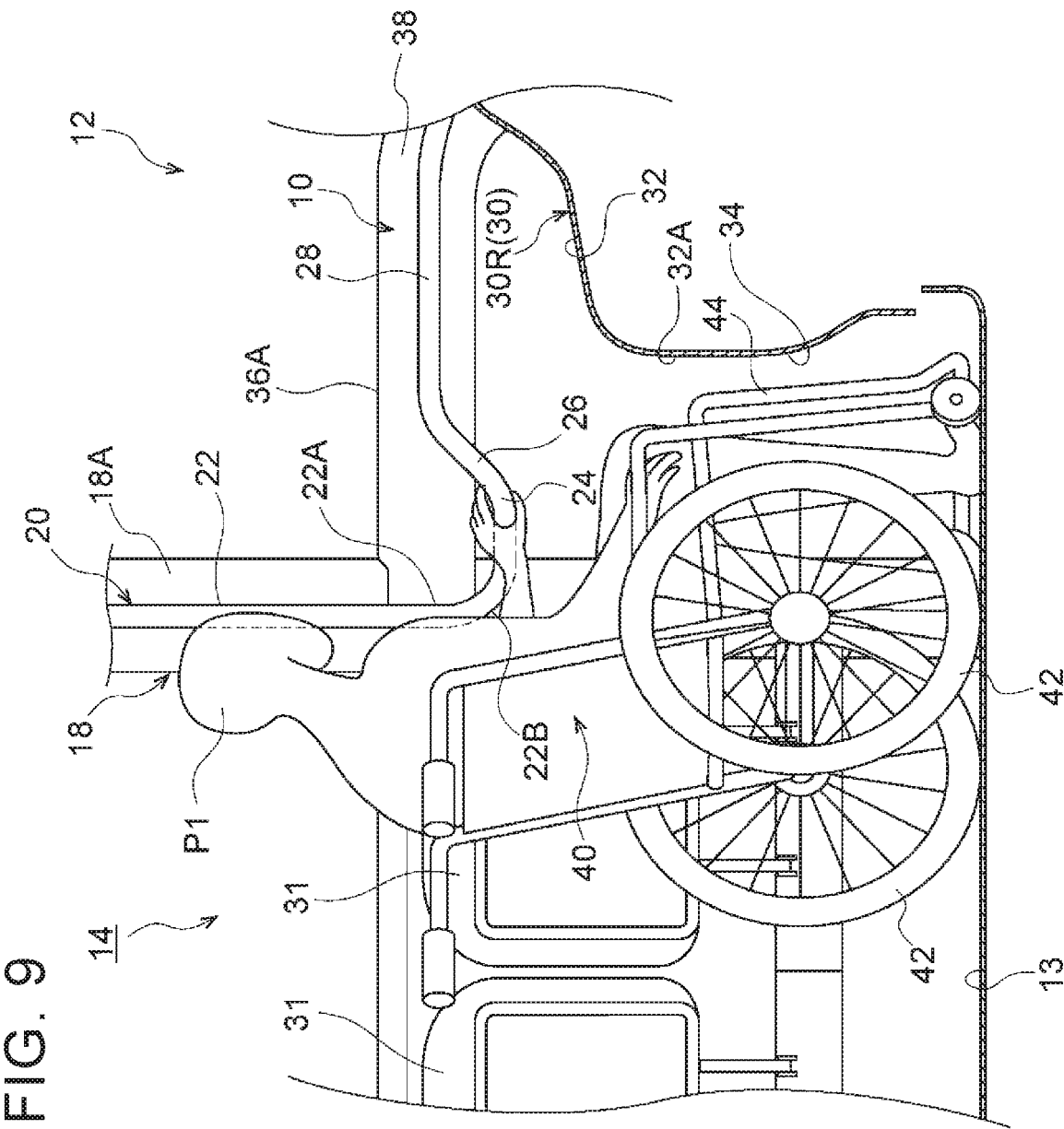
FIG. 9 is a lateral view showing the passenger in the wheelchair who grips the handrail according to the first embodiment in a diagonally backward-looking posture.

Besides, as shown in FIGS. 8 and 9, there are also cases where the passenger who sits in the wheelchair 40, for example, the adult passenger P1 is on board in a diagonally backward-looking posture in front of the right-end seat 30R. At this time, only part of the wheelchair 40, for example, the right leg support 44 abuts on the positioning portion 34 provided on the lower side of the seat 30 in such a manner as to face diagonally backward. Therefore, the position of the wheelchair 40 may become unstable in the vehicle interior 14. Accordingly, the passenger P1 in the wheelchair 40 needs to firmly (forcefully) grip the handrail 20.

It should be noted herein that no bracket is provided in a protruding manner at the lower part 22A of the first grip portion 22, the second grip portion 24, the third grip portion 26, and the fourth grip portion 28 other than the rear end part 28A, as described above. Therefore, even the passenger P1 in the wheelchair 40 who is on board in a diagonally backward-looking posture in front of the right-end seat 30R can firmly grip the second grip portion 24 and the like with his or her left hand. In consequence, even the safety of the passenger P1 in the wheelchair 40 who is on board the bus 12 in such a posture can be further improved when the bus 12 runs.

Figure 10:
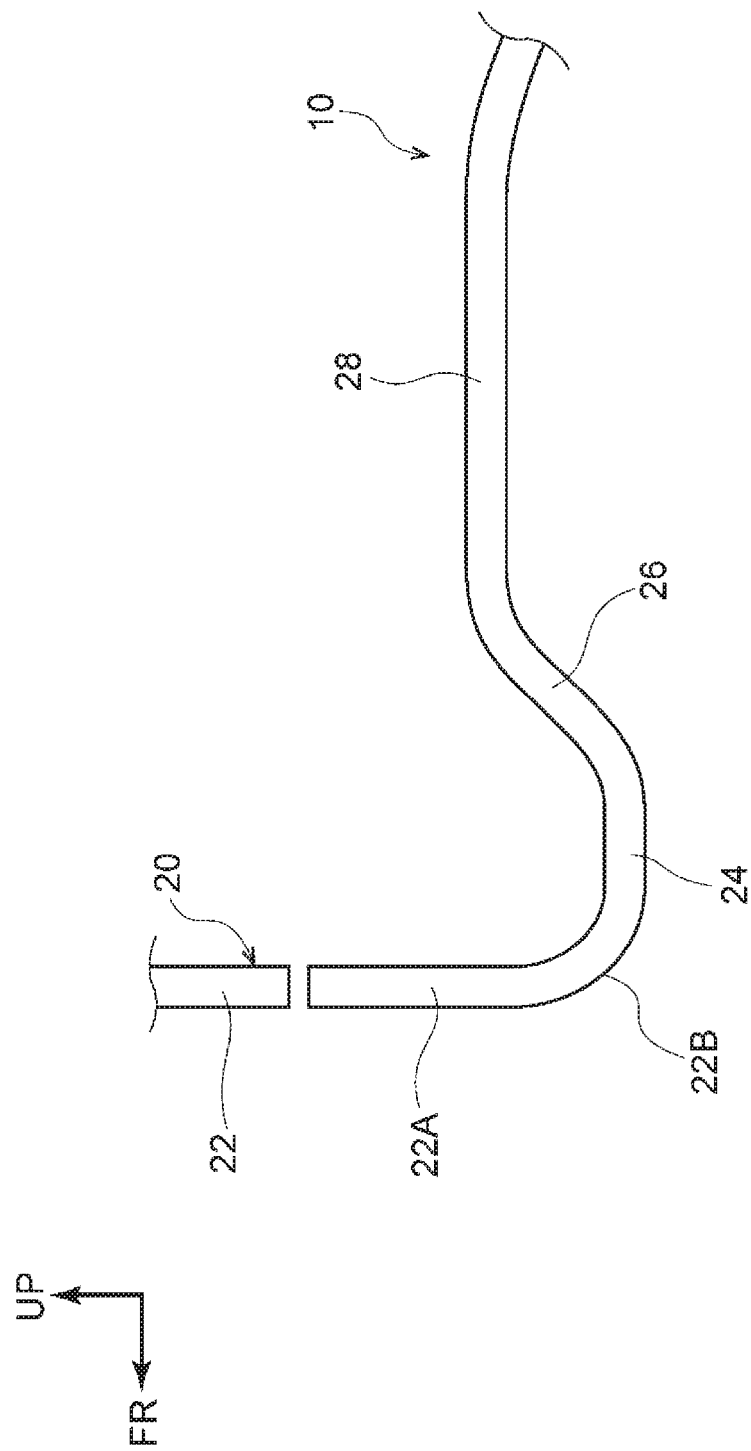
FIG. 10 is a lateral view showing a first modification example of the handrail according to the first embodiment on an enlarged scale.

Incidentally, the handrail 20 is may be formed continuously from the first grip portion 22 to the fourth grip portion 28, but is not limited thereto. For example, the lower part 22A of the first grip portion 22 may be made discontinuous by being separated from that region of the first grip portion 22 which is located above the lower part 22A (may be discontinuously formed), as in, for example, a first modification example shown in FIG. 10. In this case, a bracket is provided in a protruding manner at the first grip portion 22 (including the lower part 22A) in the vicinity of the separated region, and a tip of the bracket is attached to the pillar inner panel 18A by being fastened thereto by a bolt.

Figure 11:
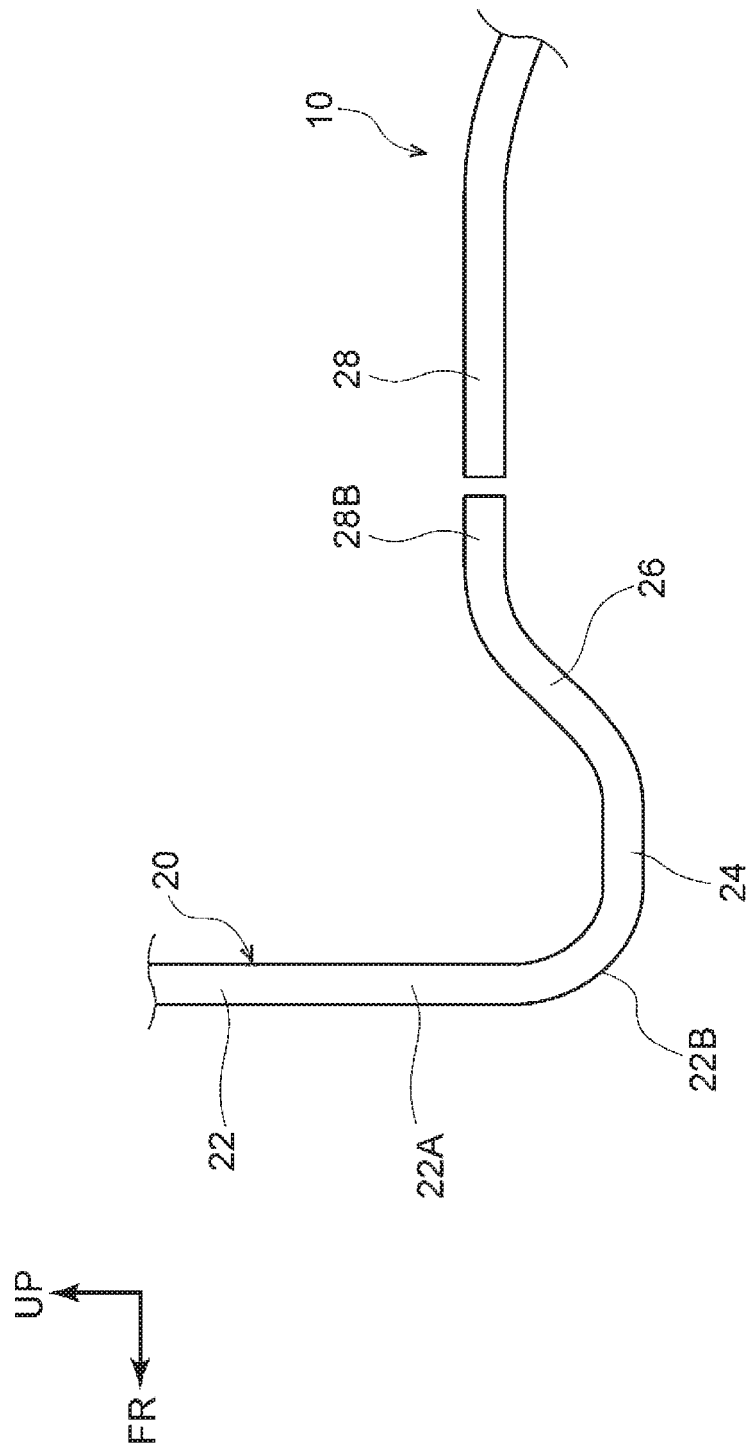
FIG. 11 is a lateral view showing a second modification example of the handrail according to the first embodiment on an enlarged scale.

Besides, a front end part 28B of the fourth grip portion 28 may be made discontinuous by being separated from that region of the fourth grip portion 28 which is located behind the front end part 28B (may be discontinuously formed) as in, for example, a second modification example shown in FIG. 11. The front end part 28B of the fourth grip portion 28 mentioned herein means a region of, for example, about 20 to 30 mm that extends backward from a border region (a bent region) between the third grip portion 26 and the fourth grip portion 28. Besides, in this case as well, a bracket is provided in a protruding manner at the fourth grip portion 28 (including the front end part 28B) in the vicinity of the separated region, and a tip of the bracket is attached to the lower trim 38 by being fastened thereto by a bolt.

Furthermore, a fifth grip portion 29 that directly and integrally couples that region of the first grip portion 22 which is located slightly above the lower part 22A (hereinafter referred to as "a coupling part") 22C and the front end part 28B of the fourth grip portion 28 to each other may be provided, as in, for example, a third modification example shown in FIG. 12. That is, a front end part 29A of the fifth grip portion 29 may be welded to the coupling part 22C of the first grip portion 22, and a rear end part 29B of the fifth grip portion 29 may be welded to the front end part 28B of the fourth grip portion 28.

Thus, for example, a child passenger in a standing posture can easily grip the fifth grip portion 29 as well as the first grip portion 22. Accordingly, when a parent and a child are on board the bus 12, the parent can grip the first grip portion 22, and the child can grip the fifth grip portion 29, so the effectiveness of this modification example is exerted. Besides, a closed space (a loop-shaped space) can be formed by the lower part 22A of the first grip portion 22, the second grip portion 24, the third grip portion 26, and the fifth grip portion 29, so the durability of the handrail 20 can be improved.

Incidentally, the handrail 20 may be configured by first forming the upper region of the first grip portion 22 other than the lower part 22A (the upper region including the coupling part 22C), the fifth grip portion 29, and the fourth grip portion 28 integrally with one another, and then welding the lower part 22A of the first grip portion 22, the second grip portion 24, and the third grip portion 26 integrally with one another. That is, the handrail 20 may be configured such that the lower part 22A of the first grip portion 22 is welded to the first grip portion 22, and that the upper end part of the third grip portion 26 is welded to the front end part 28B of the fourth grip portion 28.

Figure 12:
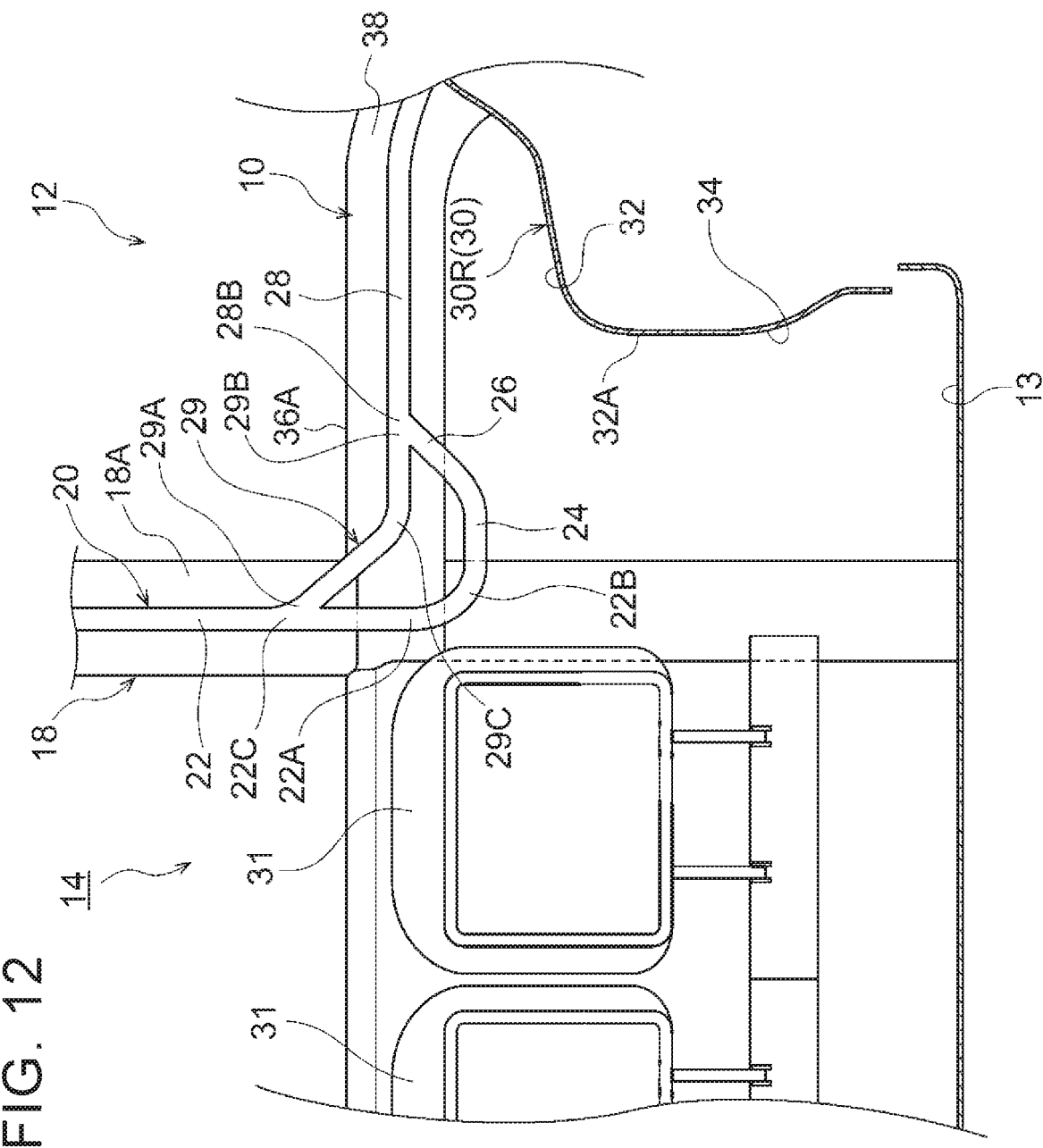
FIG. 12 is a lateral view showing a third modification example of the handrail according to the first embodiment.

Besides, the fifth grip portion 29 shown in FIG. 12 has an intermediate part 29C that is bent downward in such a manner as to form an obtuse angle, but is not limited thereto. For example, the intermediate part 29C may not be bent. That is, the coupling part 22C of the first grip portion 22 and the front end part 28B of the fourth grip portion 28 may be coupled to each other by the rectilinear fifth grip portion (not shown). Besides, the handrail 20 that substantially assumes the shape of "L" in a lateral view includes a handrail that assumes such a shape as to be provided with the fifth grip portion 29.

Second Embodiment

Next, the second embodiment will be described. Incidentally, components that are identical to those of the first embodiment are denoted by the same reference symbols respectively, and the detailed description thereof (including common operation) will be omitted as appropriate.

Figure 13:
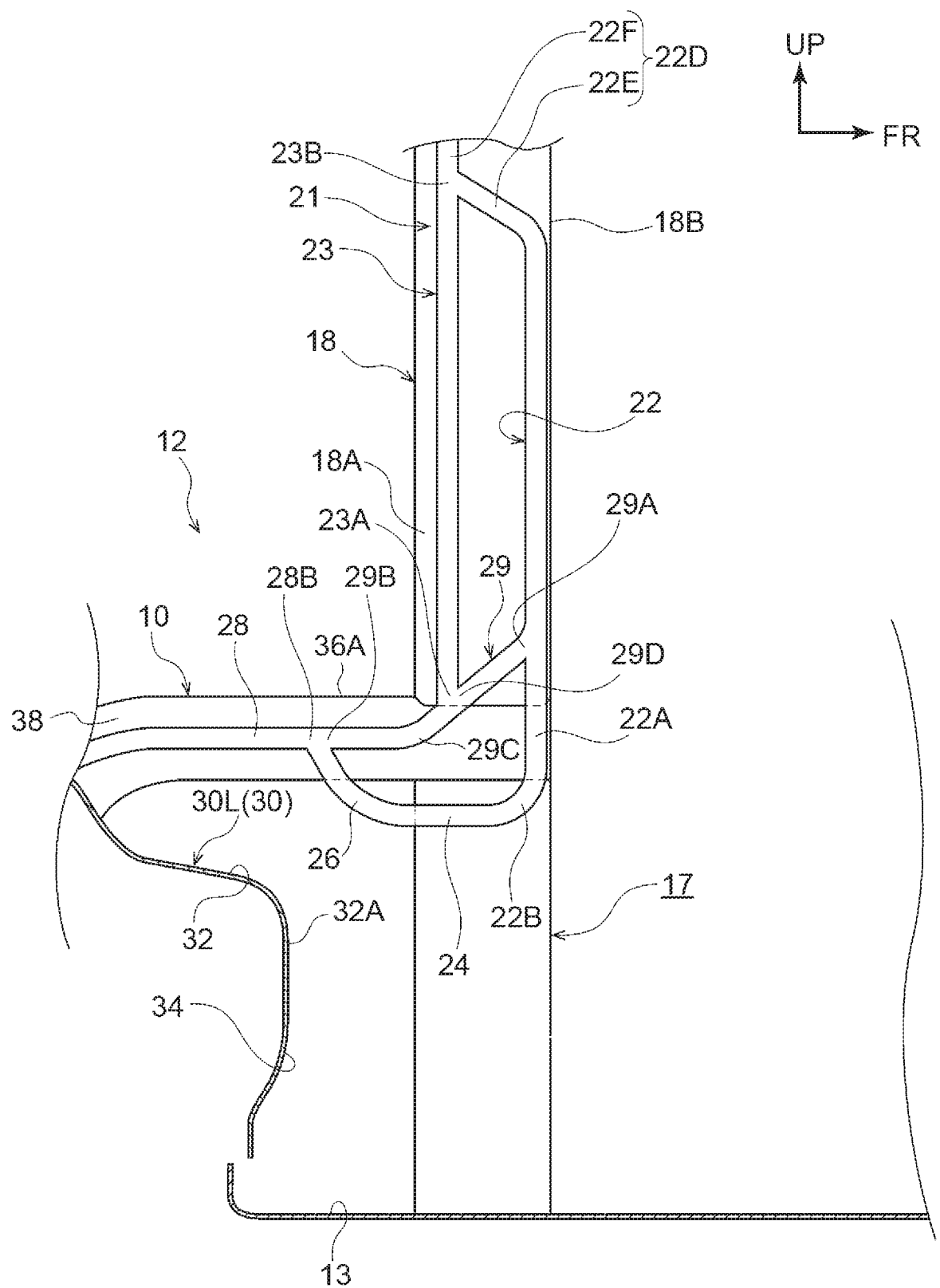
FIG. 13 is a lateral view showing a handrail according to the second embodiment.

As shown in FIG. 13, a handrail 21 according to this second embodiment is provided behind the platform 17 (no door is depicted) formed on part (a central part in the longitudinal direction) of a left lateral wall of the bus 12, and in front of a left-end seat 30L. More specifically, this handrail 21 is obtained by providing the handrail according to the third modification example of the first embodiment with a sixth grip portion 23 that integrally couples a midway part 29D of the fifth grip portion 29 and an upper part 22D of the first grip portion 22 to each other, and is provided around the platform 17.

That is, this handrail 21 is configured by welding a lower end part 23A of the sixth grip portion 23 to the midway part 29D of the fifth grip portion 29, and welding an upper end part 23B of the sixth grip portion 23 to the upper part 22D of the first grip portion 22. Moreover, the first grip portion 22 is arranged close to a front side edge portion 18B extending along the vertical direction of the pillar 18 constituting the platform 17, in the longitudinal direction, and the sixth grip portion 23 is arranged close to a central part of the pillar 18 in the longitudinal direction, in a lateral view.

Incidentally, the bus vehicle interior structure 10 according to the present embodiment is configured even when the handrails 21 according to the second embodiment are used instead of the handrails 20 according to the first embodiment. That is, the bus vehicle interior structure 10 according to the present embodiment is also constituted by the handrails 21 and the seats 30. Besides, the midway part 29D of the fifth grip portion 29 means a region that is located slightly above the intermediate part 29C bent downward in such a manner as to form an obtuse angle.

Besides, the upper part 22D of the first grip portion 22 is bent into the shape of a so-called crank, and has an inclined part 22E bent backward in such a manner as to form an obtuse angle, and a vertical part 22F bent upward from a rear end portion of the inclined part 22E in such a manner as to form an obtuse angle. The upper end part 23B of the sixth grip portion 23 is welded to a border region between the inclined part 22E and the vertical part 22F (a rear end portion of the inclined part 22E and a lower end portion of the vertical part 22F).

With the handrail 21 according to the second embodiment thus configured (shaped), for example, adult and child passengers in a standing posture can easily grip the sixth grip portion 23 as well as the first grip portion 22 and the fifth grip portion 29. Because passengers tend to gather especially around the platform 17, the handrail 21 thus shaped is effective due to an increase in the number of spots that can be gripped by the passengers.

Besides, for example, a passenger in a wheelchair and a passenger with a crooked back (or with weak legs) such as an elderly person or the like can easily grip the first grip portion 22 (including the lower part 22A) when getting on/off the bus from the platform 17. Therefore, the burden felt by the passenger in the wheelchair and the passenger such as the elderly person or the like in getting on/off the bus can be reduced, and the safety of the passenger in the wheelchair and the passenger such as the elderly person or the like in getting on/off the bus can be improved.

Besides, in this handrail 21 according to the second embodiment, a closed space (a loop-shaped space) can be formed also by the first grip portion 22 and the sixth grip portion 23, in addition to the closed space (the loop-shaped space) formed by the lower part 22A of the first grip portion 22, the second grip portion 24, the third grip portion 26, and the fifth grip portion 29. Accordingly, the durability of the handrail 21 can be made higher than the durability of the handrail 20.

Besides, although not shown in the drawing, an upper part of the sixth grip portion 23 may be bent forward and welded to the first grip portion 22, without bending the upper part 22D of the first grip portion 22 into the shape of a crank. That is, it may be appropriate to adopt a configuration in which the upper part of the sixth grip portion 23 has an inclined part bent forward in such a manner as to form an obtuse angle, and a front end portion of the inclined part may be welded to the first grip portion 22.

The bus handrails 20 and 21 and the bus vehicle interior structure 10 according to the present embodiments have been described above based on the drawings. However, the bus handrails 20 and 21 and the bus vehicle interior structure 10 according to the present embodiments are not limited to those shown in the drawings, but can be appropriately changed in design within such a range as not to depart from the gist of the disclosure.

For example, the second grip portion 24 is required only to be extended continuously from the lower part 22A of the first grip portion 22, and each of the handrails 20 and 21 may be shaped such that the lower end part 22B of the first grip portion 22 protrudes slightly further downward than the second grip portion 24. Besides, each of the handrails 20 and 21 may be formed in such a shape as to continue in a circular manner from the lower end part 22B of the first grip portion 22 to the front end part 28B of the fourth grip portion 28 in a lateral view. That is, each of the handrails 20 and 21 may be configured such that the second grip portion 24 and the third grip portion 26 continue from each other in such a manner as to form a curved shape, instead of being configured such that the second grip portion 24 and the third grip portion 26 continue from each other in such a manner as to form an obtuse shape.

Besides, the seats 30 are not required to be configured to be provided on the rear wall 15 side. For example, in the case of an automatically driven bus or the like, the seats 30 may be provided on a front wall (not shown) side (the seats 30 may be front seats). In this case, each of the handrails 20 and 21 is configured such that the second grip portion 24, the third grip portion 26, and the fourth grip portion 28 integrally extend sequentially forward from the lower end part 22B (the lower part 22A) of the first grip portion 22 in the same manner as described above.

Besides, the seats 30 may be provided on both the rear wall 15 side and the front wall side. That is, the seats 30 are required only to be provided on at least one of the rear wall 15 side and the front wall side. Besides, the bus handrail 20 according to the present embodiment is configured to be easily grippable by passengers in a variety of postures, namely, adult and child passengers in a standing posture, adult and child passengers in a half-standing posture, and adult and child passengers in the wheelchair 40, but is not limited thereto. For example, the bus handrail 20 is configured to be easily grippable also by passengers with a crooked back such as elderly persons as mentioned in the second embodiment.

What is claimed is:

1. A bus handrail that is provided in a vehicle interior of a bus in a shape of "L" as viewed in a vehicle width direction, the bus handrail comprising, in an installed state thereof:
   a first grip portion that extends in a vehicle vertical direction;
   a second grip portion that extends toward one side in a vehicle longitudinal direction continuously from a lower part of the first grip portion;
   a third grip portion that extends upward with respect to a vehicle continuously from the second grip portion; and
   a fourth grip portion that extends toward one side in the vehicle longitudinal direction continuously from the third grip portion.

2. The bus handrail according to claim 1, further comprising:
   a fifth grip portion that directly couples the first grip portion and the fourth grip portion to each other.

3. A bus handrail that is provided in a vehicle interior of a bus, the bus handrail comprising, in an installed state thereof:
   a first grip portion and that extends in a vehicle vertical direction;
   a second grip portion that extends toward one side in a vehicle longitudinal direction continuously from a lower part of the first grip portion;
   a third grip portion that extends upward with respect to a vehicle continuously from the second grip portion;
   a fourth grip portion that extends toward one side in the vehicle longitudinal direction continuously from the third grip portion;
   a fifth grip portion that directly couples the first grip portion and the fourth grip portion to each other; and
   a sixth grip portion that directly couples an upper part of the first grip portion and a midway part of the fifth grip portion to each other.

4. The bus handrail according to claim 1, wherein
   a height of the second grip portion from a floor surface in the vehicle interior ranges from 700 to 800 mm.

5. The bus handrail according to claim 4, wherein
   an angle that is formed by the second grip portion and the third grip portion is an obtuse angle.

6. The bus handrail according to claim 5, wherein
   the obtuse angle ranges from 100 to 150°.

7. A bus vehicle interior structure comprising:
   the bus handrail according to claim 1; and
   a seat that is provided on at least one of a front wall side and a rear wall side in the vehicle interior and in which a passenger sits in a half-standing posture, wherein
   part of the fourth grip portion is arranged outside the seat in the vehicle width direction.

8. The bus vehicle interior structure according to claim 7, wherein
   the third grip portion is arranged between the first grip portion and the seat as viewed in the vehicle width direction.

9. The bus vehicle interior structure according to claim 7, wherein
   a positioning portion against which part of a wheelchair is placed to be positioned is provided on a lower side of the seat with respect to the vehicle.

10. The bus handrail according to claim 1, wherein the second grip portion includes a first end and an opposite second end, the first end of the second grip portion is coupled to the first grip portion, the third grip portion extends upwardly in the vehicle vertical direction from the second end of the second grip portion.

11. The bus handrail according to claim 3, wherein the second grip portion includes a first end and an opposite second end, the first end of the second grip portion is coupled to the first grip portion, the third grip portion extends upwardly in the vehicle vertical direction from the second end of the second grip portion.

\* \* \* \* \*